United States Patent [19]

Wada et al.

[11] Patent Number: 4,685,349

[45] Date of Patent: Aug. 11, 1987

[54] FLEXIBLY FOLDABLE ARM

[75] Inventors: Mitsuo Wada; Kazue Nishihara, both of Ibaraki, Japan

[73] Assignee: Agency of Industrial Science and Technology, Tokyo, Japan

[21] Appl. No.: 811,471

[22] Filed: Dec. 20, 1985

[51] Int. Cl.[4] .......................... G05G 11/00; B25J 11/00
[52] U.S. Cl. ........................................... 74/479; 414/7; 414/680; 414/744 R; 901/15; 901/21; 901/28
[58] Field of Search ............... 414/7, 730, 680, 744 R; 901/9, 28, 29, 15, 21; 74/479

[56] References Cited

U.S. PATENT DOCUMENTS

| | | | |
|---|---|---|---|
| 2,765,930 | 10/1956 | Greer et al. | 901/28 X |
| 3,266,059 | 8/1966 | Stelle | 901/28 X |
| 3,497,083 | 2/1970 | Anderson | 901/28 X |
| 4,566,843 | 1/1986 | Iwatsuka et al. | 901/21 X |
| 4,600,355 | 7/1986 | Johnson | 901/15 X |

FOREIGN PATENT DOCUMENTS 55-13874  4/1980  Japan .

OTHER PUBLICATIONS

Hirose et al., "The Development of the Soft Gripper for the Versatile Robot Hand", 7th Intl. Symp. on Ind. Robots, Tokyo Inst. of Technology, 6/1983, pp. 353-360.

Primary Examiner—L. J. Paperner
Assistant Examiner—P. McCoy Smith
Attorney, Agent, or Firm—Oblon, Fisher, Spivak, McClelland, & Maier

[57] ABSTRACT

A flexibly foldable arm includes a series of arm sections each constituted by a plural number of joint members pivotally and serially connected to one another by connector shafts for rotation about two perpendicularly intersecting axes; a pair of pulleys mounted the connector shafts at each end of the joint members; and a pair of arm operating wires having base ends thereof wound in opposite directions on winding shafts of drive motors in such a manner as to alternately reel up or off the wires threaded around paired pulleys in each arm section to flex the same into a curve folded state as a whole by forward and reverse rotations of the motors. By driving the independently flexible arm sections which are connected in series, the arm can be flexed into an arbitrary shape irrespective of existence of an object to be gripped and can be folded to grip an object if the latter is in the way of the flexing movement of the arm.

3 Claims, 8 Drawing Figures

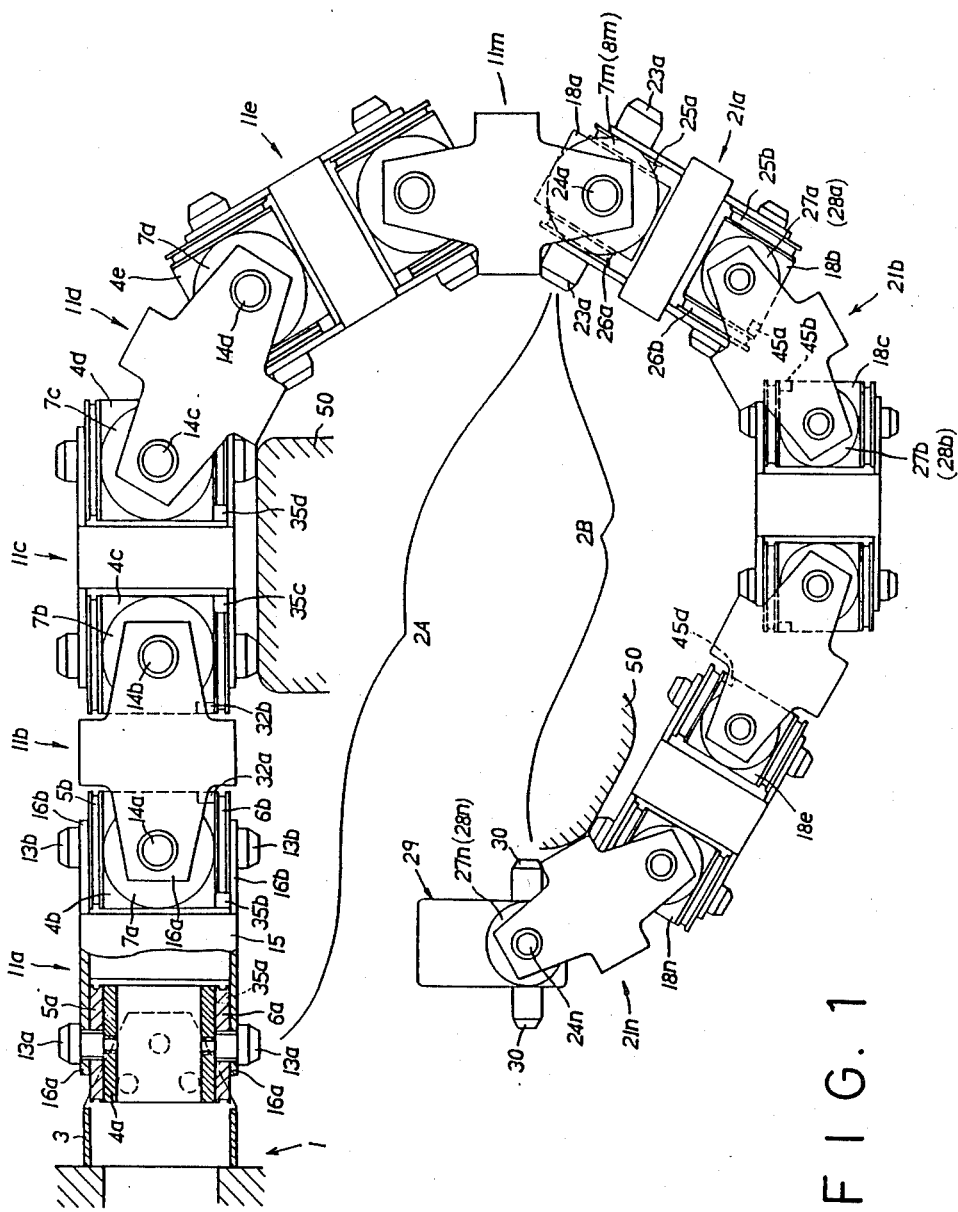
F I G. 1

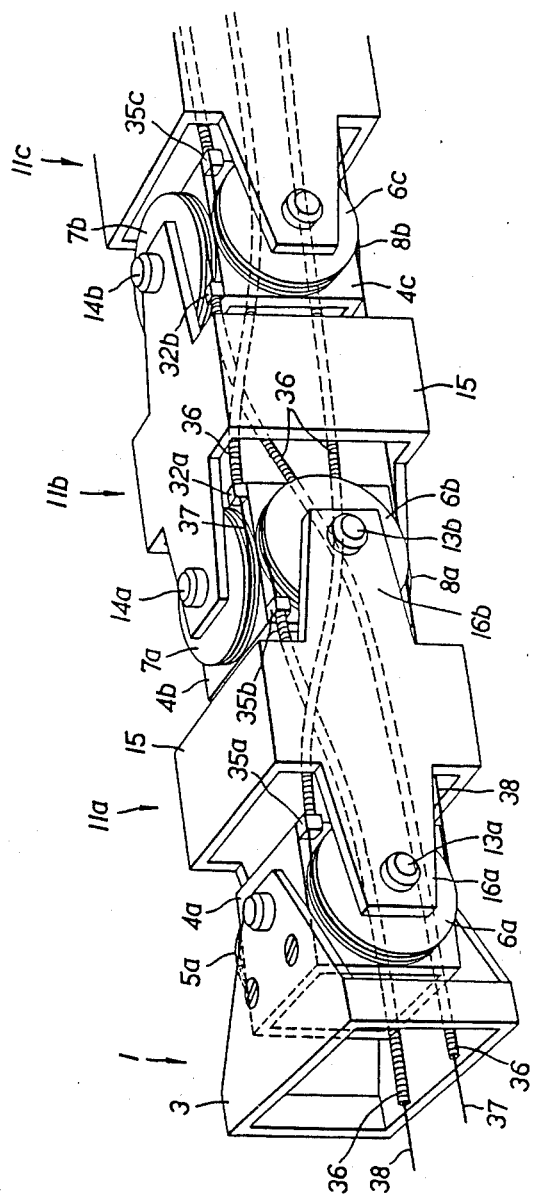

FLEXIBLY FOLDABLE ARM

BACKGROUND OF THE INVENTION

1. Field of the Invention

This invention relates to a flexibly foldable arm suitable for application as a robot arm or finger, and more particularly to a flexible arm which can be positively folded around an object of an arbitrary form to wrappingly grip the same.

2. Description of the Prior Art

It has thus far been known in the art to provide a flexible arm consisting of a plural number of link plates which are connected pivotally by pins and flexibly foldable by transmitting drive force through wires which are successively fitted around pulleys at the respective joints as described, for example, in Japanese Patent Publication No. 55-13874. The flexible arms of this sort, in which the arm operating force is transmitted by wires and pulleys, is advantageously simple in the construction of the drive system as compared with the arms with a rotational drive actuator at each joint. However, since the conventional drive systems are arranged to fold the link plates successively around an aimed object when part of the link plates comes into contact with the latter, it is difficult to flex an arm freely into a desired shape, for instance, into a C-shape or S-shape and to stretch out an arm to evade an obstacle irrespective of existence of an object to be gripped.

SUMMARY OF THE INVENTION

It is an object of the present invention to provide a flexible arm consisting of a series of arm sections which are each constituted by a multitude of rotatably connected joint members, permitting the arm to fold or flex into an arbitrary form irrespective of the existence of an object to be gripped by the arm.

It is another object of the present invention to provide a flexible arm of the type consisting of a multitude of pivotable arm joint members and employing wires and pulleys as drive force transmitting means, the flexible arm being flexible into an arbitrary shape irrespective of the existence of an object to be gripped by the arm and being foldable around such an object if required.

It is a further object of the present invention to provide a flexible arm consisting of a number of arm sections which are three-dimensionally flexible for moving the arm as a whole in such a manner as to evade an obstacle if necessary.

It is still another object of the invention to provide a flexible arm of the type mentioned above, in which the respective arm sections are flexibly foldable simply by threading arm operating wires.

A further object of the present invention is to provide a flexible arm consisting of a series of arm sections which are driven by wires independently of each other, passing a wire for a fore arm section through a rear arm section to provide an arm which is simple in construction and outer shape and small in size as compared with the conventional flexible arms with actautors at the respective joints.

In accordance with the present invention, the above-mentioned objects are achieved by the provision of a flexibly foldable arm which essentially comprises: a series of arm sections each constituted by a plural number of joint members pivotally connected one after another by connector shafts for rotation about two perpendicularly intersecting axes; a pair of pulleys mounted on the connector shafts at each end of the joint members; and a pair of arm operating wires having base ends thereof wound in opposite directions on winding shafts of drive motors in such a manner as to reel up or off the wires alternatively and being threaded around the paired pulleys in each arm section to flex the same into a curved folded state as a whole by forward and reverse rotations of the motors; the wires for operating a front arm section being passed through a rear arm section and led to the drive motors mounted on a base structure.

The above and other objects, features and advantages of the invention will become apparent from the following description and the appended claims, taken in conjunction with the accompanying drawings which show by way of example preferred embodiments of the invention.

BRIEF DESCRIPTION OF THE DRAWINGS

In the accompanying drawings:

FIG. 1 is a partly cutaway plan view of an embodiment of the invention in a flexed state;

FIG. 2 is a perspective view of part of the arm in a stretched state;

DESCRIPTION OF PREFERRED EMBODIMENTS

Figure 3A:
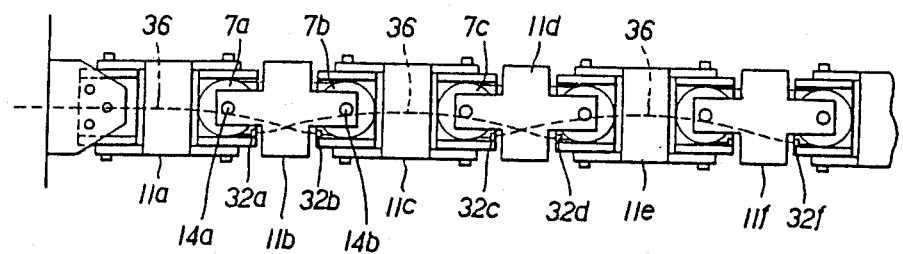
FIGS. 3A and 4A are a plan view and a side view showing the manner of fixing flexible tubes in the first arm of the above-mentioned embodiment.

Hereafter, the invention is described more particularly with reference to the embodiments shown in the drawings.

Shown in FIG. 1 is an embodiment of the flexible arm according to the invention in a flexed state, with arm operating wires and wire threading tubes removed for the convenience of illustration, and in FIG. 2 on an enlarged scale is a base portion of the flexible arm.

The flexible arm includes in series a base 1, a first arm section 2A consisting of a plural number of pivotally connected arm joint members, and a second arm section 2B similar to the first arm section but a little smaller in size. The first and second arm sections 2A and 2B can be flexed independently by separate wires in arbitrary directions in a plane parallel with the face of FIG. 1 and a plane perpendicular to the first plane.

The base 1 is internally provided with four wire drive motors, as will be described below in connection with FIGS. 3B and 4B, each one of these wire drive motors having base end portions of a pair of wires wound on its winding shaft in opposite directions such that one of the paired wires is reeled upon the winding shaft and the other wire is reeled off by rotation in one direction of the winding shaft. The base 1 further includes a support frame 3 for securely supporting the base end portion of the first arm section 2A.

The first arm section 2A is attached to the base 1 through a hollow frame 4a which is securely fixed to the support frame 3. More particularly, a pair of pulleys 5a and 6a are fixedly mounted on a first joint member 11a of the first arm section 2A in contact with the opposite lateral side walls of the frame 4a, pivotally connecting the first joint member 11a to the frame 4a by connector shafts 13a along with the pulleys 5a and 6a.

The first joint member 11a is provided with a hollow box-like body portion 15 and two pairs of link plates 16a and 16b which are extended in opposite directions from the lateral side walls of the body portion 15, the pair of link plates 16a on the side of the base end being disposed in such a manner as to hold the frame 4a through the pulleys 5a and 6a and pivotally connected to the frame 4a by the connector shafts 13a.

The fore end of the first joint member 11a is connected to a second joint member 11b through a hollow frame body 4b for pivoting movements about two perpendicularly intersecting axes. More particularly, the pair of link plates 16b at the fore end of the first joint member 11a are disposed in such a manner as to hold the frame body 4b with pulleys 5b and 6b fixed mounted on its opposite lateral walls, and pivotally connected to the latter by a pair of connector shafts 13b. Further, the second joint member 11b with pulleys 7a and 8a fixedly mounted on the inner side walls thereof is pivotally connected to the remaining side walls of the frame body 4b. The second joint member 11b has the same construction as the first joint member 11a and is shifted 90 degrees relative to the latter. A pair of connector plates 16a at the base end of the second joint member 11b are disposed to hold the frame body 4b through pulleys 7a and 8a which are fixed to the connector plates, and pivotally connected to the frame 4b by a pair of pivoting shafts 14a to permit the pulleys 7a and 8a and second joint member 11b to rotate about an axis perpendicular to the afore-mentioned pivoting shaft 13b. The fore end of the second joint member 11b is linked to a third joint member 11c pivotally about two perpendicularly intersecting axes through the same joint construction as the one between the first and second joint members 11a and 11b described above. Fourth and fifth joint members as well as the succeeding joint members are linked in a similar manner.

Each one of the above-mentioned connector shafts has the circumferential edges portions of its fore end cut off to present a tapered shape, which is abutted against a box-like body portion of a joint member to limit the rotational angle of the latter as indicated by the joint member 11d in FIG. 1.

The foremost joint member 11m of the first arm section 2A, which is formed by linking a suitable number of joint members in the above-described manner, functions as a base for the second arm section 2B, and the joint members 21a, 21b ... 21n of the second arm section 2B are pivotally linked thereto one after another.

The second arm section 2B is formed in a smaller size than the first arm section 2A, except for the connector shafts 23a at the rear end of the first joint member 21a of the second arm section 2B, pulleys 7m and 8m fixed on the rear frame body 18a and their connector shafts 24a, which are formed in the same size as in the first arm section 2A for linkage to the foremost or last joint member of the first arm section. That is to say, in the second arm section 2B, a number of smaller joint members 21a, 21b ... 21n are successively linked for rotation about two perpendicularly intersecting axes through frame bodies 18b ... 18n in the same manner as in the first arm section 2A, with pulleys 25b, 26b, 27b, 28b and so forth fixed on the frame bodies and pulleys 25a, 26a, 27a, 28a and so forth fixed to the rear portions of the joint members 21a, 21b ... 21n. A distal member 29 with pulleys 27n and 28n fixed thereto is pivotally connected to the foremost joint member 21n by connector shafts 24n, and provided with rotation limiting rods 30, which are laterally projected from the opposite sides of the distal member 29 and circumferentially tapered off at the respective outer ends similarly to the connector shafts.

In the first and second arm sections 2A and 2B, the pivoting movements of respective joint members and the distal member about the connector shafts are limited to a predetermined angle (e.g., 30 degrees) by abutment of the tapered outer ends of the connector shafts or the rotation limiting rods 30 against the box-like body portions 15 of the joint members, thereby preventing the arm operating wires from being bent to an extreme degree as will be explained below.

As shown in FIGS. 1 and 2, flexible tube support members 32a, 32b ... 32m and 35a, 35b ... 35m of small blocklike shape are fixedly mounted on the frame bodies 4a, 4b ... 4m of the first arm section 2A in laterally spaced positions as will be described below, and a flexible tube 36 is passed in loosely curved state through the frame bodies and joint members between the base 1 and each flexible tube support.

Namely, on one side of the first arm section 2A, the flexible tube support members 32a, 32b ... 32m are located in opposing positions on the frame bodies 4b and 4c at the rear and front sides of the second joint member 11b, in opposing positions on the frame bodies 4d and 4e at the rear and front sides of the fourth joint member 11d, and in opposing positions on the frame bodies at the rear and front sides of joint members in even number positions, as shown particularly in FIGS. 2 and 3A. A flexible tube 36 is extended between the support 32 on the base 1 and the second support 32b, between the first and fourth support members 32a and 32d and between the third and sixth support members 32c and 32f, passing a wire through these flexible tubes 36 as shown in FIG. 3, winding the wire around the pulleys 7a and 7b between the resepctive flexible tubes and fixing the distal end of the wire to the frame body which mounts the terminal pulley.

Thus, the wire is successively threaded around the adjacently located pairs of the juxtaposed pulleys, more particularly, around the first pair of adjacently located pulleys and then around the second pair in such a manner as to turn each pair of pulleys in the same direction. Between the adjacent pairs of pulleys, the wire is led through the flexible tube which is passed through the joint members and frame bodies, so that the fore end of the wire which is fitted around the respective pulleys is fixedly secured to a frame body with a pulley on which the wire is finally fitted.

Figure 3B:
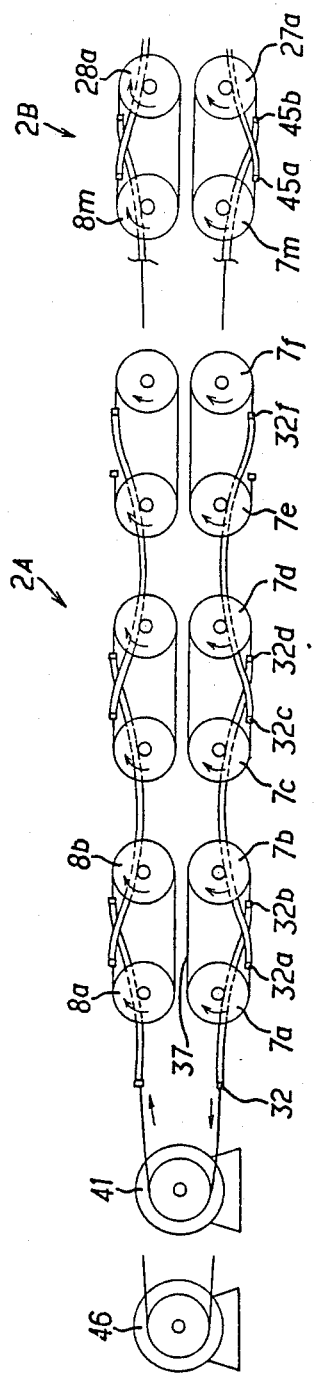
FIGS. 3B and 4B are views showing the manner of fitting wires on a row of pulleys.

On the opposite side of the first arm section 2A, the flexible tube support members and flexible tubes (both not shown) are mounted in symmetrical relation with the ones in FIG. 3A, namely, they are mounted in vertically reversed positions relative to FIGS. 3A and 3B, and a wire is passed therethrough in a similar manner.

Figure 4A:
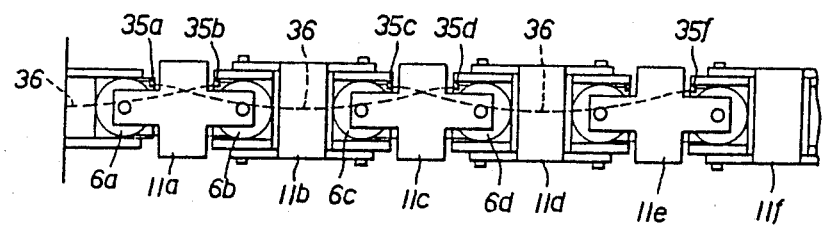
Figure 4B:
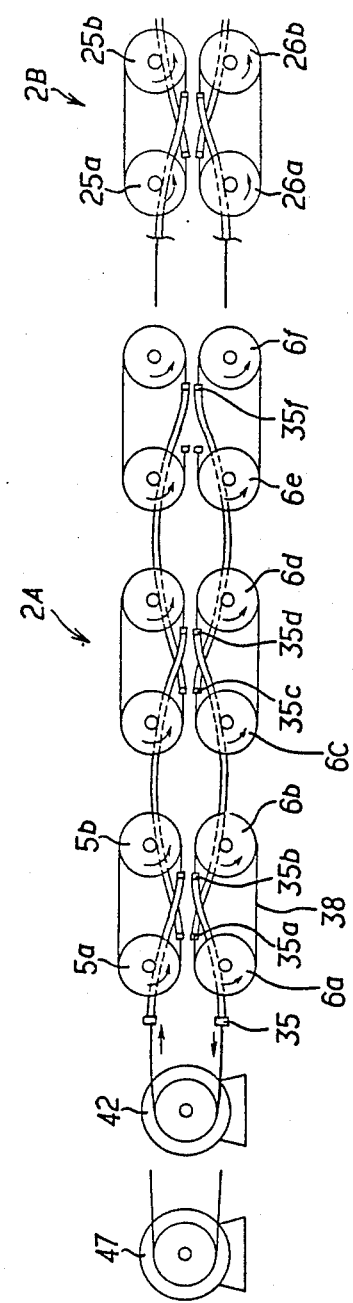

On the other side of the first arm section 2A, flexible tube support members 35a, 35b ... 35m are oppposingly mounted opposingly on the frame bodies 4a and 4b and frame bodies 4c and 4d at the opposite ends of the first and second joint members 11a and 11c, namely, on the frame bodies of the joint members in odd number positions, as shown in FIGS. 4A and 4B, and a flexible tube 36 is extended between the support member 35 on the base 1 and the second support member 35b, between the support members 35a and 35d and between the support members 35c and 35f. As shown in FIG. 4B, a wire 38 is threaded through these flexible tubes, fitting the wire 38 around the paired pulleys 6a and 6b between the adjacent flexible tubes. On the other side of the first arm section 2A, the flexible tube support members and flexible tubes (both not shown) are mounted in symmetric relation with those in FIG. 4A, and a wire is threaded therethrough in a similar manner.

The wires 37 and 38 which are fitted around the paired pulleys at the opposite sides of the flexible arm are wound as a couple on the winding shafts of the drive motors 41 and 42 on the base 1 in opposite directions, so that one wire is reeled up and the other wire is reeled off by forward and reverse rotations of the drive motors.

On the other hand, at each side of the second arm section 2B, flexible wire support members and flexible wires are mounted in the same manner as in the above-described first arm section 2A, threading the wire therethrough. Namely, at one side of the second arm section 2B, for instance, a flexible tube is extended in a curved state between the tube support member in the base 1 and a flexible tube support member 45b on the frame body 18c through the first arm section 2A, and between a flexible tube support member 45a on the frame body 18b and a flexible tube support member 45d on the frame body 18e. Of course, other flexible tube support members are provided in the second arm section 2B, and a wire is threaded therethrough in the same manner as described hereinbefore in connection with the first arm section 2A. The wires which are threaded in the second arm section 2B are reeled independently on winding shafts of drive motors irrespective of the wires which are threaded in the first arm section 2A. Accordingly, four drive motors are mounted on the base body 1 in total. Motors 46 and 47 drive wires for the arm section 2B.

Although the flexible arm consists of two arm sections 2A and 2B in the foregoing embodiment, it is possible to add an additional arm section or sections arbitrarily depending upon circumstances. Practically, it is suitable to cover the first and second arm sections 2A and 2B in a protective tube (not shown) of rubber or other flexible material. In such a case, the protective cover may of a shape which fits along the outer shape of the arm sections or of a cylindrical shape which circumscribes the arm sections.

In operation of the above-described flexible arm, one of the paired wires in the first or second arm section is reeled off upon reeling up the other wire by a motor on the base, causing the first or second arm section to flex in an arbitrary direction along one of two perpendicularly intersecting planes and holding an object if it is in the way of the arm.

For example, if the wire 37 is reeled up and drawn toward the base end in FIGS. 3A and 3B, its tensile force is successively transmitted to the paired pulleys 7b and 7a at the base end, turning the third and second joint members 11c and 11b in the rightward direction about the connector shafts 14b and 14a relative to the second and first joint members 11b and 11a (frame body 4b). By reeling up the wire 37 further until the just-mentioned joint members come to the limits of rotation, the wire 37 is slidingly pulled relative to the pulleys 7a and 7b, and the resulting tensile force is transmitted to the pulleys 7c and 7d to turn the fourth and fifth joint members 11d and 11e about the connector shafts 14c and 14d, respectively. These movements are transmitted toward the fore end of the arm to turn the respective joint members into a flexed state.

In case an object 50 to be gripped by the arm is in the way as shown in FIG. 1, the joint members tend to flex successively from the base end upon reeling up the wire 37, and, as soon as a joint member is abutted against the object 50, the tensile force of the wire 37 is transmitted toward the fore end thereby folding the joint members in the fore end portion of the arm around the object 50.

Further, the wires 37 and 38 can be reeled up simultaneously in the first arm section 2A for flexing the arm in two directions, i.e., a direction parallel with the face of FIG. 1 and a direction perpendicular to the face of FIG. 1.

Of course, the second arm section 2B can be operated in a manner similar to the first arm section 2A.

The first and second arm sections 2A and 2B can be flexed independently of each other, so that a flexible arm which consists of a series of such first and second arm sections 2A and 2B can be bent arbitrarily into C—, O— or S— shape or other three-dimensional shape in a space.

The arm operating wires in the arm sections 2A and 2B may be threaded around the pulleys in the respective rows in a reversed order, namely, from the ones in anterior positions in order to flex the arm from its fore end.

Figure 5A:
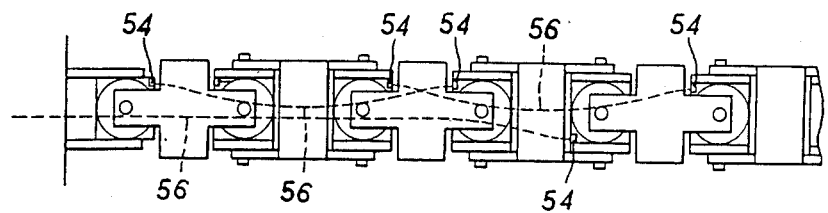
FIGS. 5A and 5B are a plan view and a diagrammatic view of another embodiment showing a different manner of fixing flexible tubes, and fitting wires.
Figure 5B:
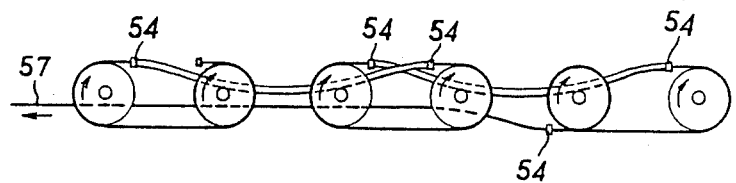

For example, it is possible to mount the flexible tube support members 54 and flexible tubes 56 in the first arm section 2A as shown in FIG. 5A, threading a wire 57 from a pulley in the foremost position under the guidance of the flexible tubes 56 as shown in FIG. 5B and fixing the fore end of the wire to a final pulley or a frame body which mounts the final pulley. That is to say, the wire 57 is firstly fitted around a pair of pulleys in the foremost position and then around a pair of pulleys in the next foremost position, and, after threading around a pair of pulleys in the rearmost position, the fore end of the wire is fixed to the frame body on which the final pulley is mounted.

With the foregoing arrangement, upon pulling the wire 57 toward the base, the joint members of the arm are flexed successively from the ones in fore positions by the tensile force of the wire.

It is also possible to thread the two kinds of wires in the first and second arm sections 2A and 2B from opposite directions by the methods described hereinbefore, namely, to thread the wires in such a manner as to flex the joint members from the base end with regard to the paired pulleys which are in rows along the opposing side walls in the first and second arm sections and to thread the wires in such a manner as to flex the joint members from the fore end with regard to the paired pulleys which are in row oppositely along the remaining side walls, for flexing the first and second arm sections differently in the respective planes of flexion.

It is to be understood that the foregoing embodiments show merely preferred forms of the invention and that various alterations and modifications can be made thereto without departing from the scope of the invention as defined in the appended claims.

What is claimed is:

1. A flexibly folding arm comprising at least two serially connected arm sections, each said arm section having a base end and a fore end and comprising:
   a plurality of joint members, each having a base end and a fore end;

hollow frame bodies positioned between base and fore ends of adjacent ones of said joint members;

first connector shafts extending along a first axis for rotatably connecting base ends of each said joint member with a respective one of said frame bodies;

a pair of first pulleys fixed to each of said joint members at said first axis, whereby each pair of said first pulleys rotates with a respective joint member about a respective said first axis;

second connector shafts extending along a second axis for rotatably connecting fore ends of each said joint member with a respective other of said frame bodies, said first and second axes being mutually perpendicular and mutually intersecting with respective second and first axes of an adjacent joint member, whereby adjacent ones of said joint members are offset by 90° about an axis perpendicular to a plane defined by said first and second axes;

a pair of second pulleys fixed to each of said frame bodies at said second axes, whereby each of said second pulleys rotates with a respective frame body about a respective said second axis;

a stationary base;

an additional one of said frame bodies rotatably connected between said base and one of said joint members by one of said first connector shafts;

a first wire wound around one pulley of both of said pairs of first and second pulleys for every second one of said joint members of each said arm section in such a manner that all of said one pulleys rotate in the same direction;

a second wire wound around another pulley of both of said pairs of first and second pulleys for said every second one of said joint members of each said arm section in such a manner that all of said another pulleys rotate in a direction opposite to that of said one pulleys of said every second one of said joint members;

a third wire wound around one pulley of both of said pairs of first and second pulleys for ones of said joint members alternate to said every second ones of said joint members of each said arm section in such a manner that all of said one pulleys rotate in the same direction;

a fourth wire wound around another pulley of both of said pairs of first and second pulleys for said ones of said joint members alternate to said second ones of said joint members of each said arm section in such a manner that all of said another pulleys of said alternate joint members rotate in a direction opposite to that of said one pulleys of said alternate joint members;

a first drive motor for said first and second wires of each said arm section, said first and second wires being wound on said first drive motor such that rotation of said first drive motor winds said first and second wires in opposite directions;

a second drive motor for said third and fourth wires of each said arm section, said third and fourth wires being wound on said second drive motor such that rotation of said second drive motor winds said third and fourth wires in opposite directions; and flexible tubes extending within said frame bodies and joint members, said first through fourth wires of all of said arm sections extending within said flexible tubes, except those portions of said wires wound around said pulleys, whereby said arm can fold in three dimensions.

2. The arm of claim 1, wherein each of said first through fourth wires is wound first on pulleys of said joint members closest to said base and from there to pulleys of joint member successively further from said base.

3. The arm of claim 1, wherein each of said first through fourth wires is wound first on pulleys of said joint members furthest from said base and from there to pulleys of joint members successively closer to said base.

* * * * *